US012629926B2

(12) United States Patent
Komurasaki et al.

(10) Patent No.: US 12,629,926 B2
(45) Date of Patent: May 19, 2026

(54) DECORATIVE SHEET AND DECORATIVE MATERIAL

(71) Applicant: DAI NIPPON PRINTING CO., LTD., Tokyo-to (JP)

(72) Inventors: Mayuko Komurasaki, Tokyo-to (JP); Yuki Kumagai, Tokyo-to (JP); Katsuji Nakamura, Tokyo-to (JP); Koji Moriyama, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/851,995

(22) PCT Filed: Mar. 28, 2023

(86) PCT No.: PCT/JP2023/012559
§ 371 (c)(1),
(2) Date: Sep. 27, 2024

(87) PCT Pub. No.: WO2023/190538
PCT Pub. Date: Oct. 5, 2023

(65) Prior Publication Data

US 2025/0282125 A1 Sep. 11, 2025

(30) Foreign Application Priority Data

Mar. 28, 2022 (JP) ................................ 2022-052607

(51) Int. Cl.
*B32B 7/12* (2006.01)
*B32B 27/08* (2006.01)
(Continued)

(52) U.S. Cl.
CPC ................ *B32B 27/08* (2013.01); *B32B 7/12* (2013.01); *B32B 27/16* (2013.01); *B32B 27/32* (2013.01);
(Continued)

(58) Field of Classification Search
CPC .... B32B 3/00; B32B 3/14; B32B 3/18; B32B 27/32; B32B 2307/71; B32B 17/10678
See application file for complete search history.

(56) References Cited

U.S. PATENT DOCUMENTS

2024/0165660 A1* 5/2024 Endoh .................... C08J 7/0427

FOREIGN PATENT DOCUMENTS

CN 113795381 A 12/2021
JP 2000-117905 A 4/2000
(Continued)

OTHER PUBLICATIONS

Jun. 20, 2023 International Search Report issued in International Patent Application No. PCT/JP2023/012559.
(Continued)

*Primary Examiner* — Elizabeth E Mulvaney
(74) *Attorney, Agent, or Firm* — Oliff PLC

(57) ABSTRACT

A decorative sheet for exterior materials includes a substrate layer, a design layer, a transparent resin layer, and a surface protective layer in this order. The substrate layer contains a polyolefin. The transparent resin layer contains a polyolefin. The surface protective layer contains a cured resin, a first UV absorber having an absorption peak at a first wavelength, a second UV absorber having an absorption peak at a second wavelength longer than the first wavelength, and a third UV absorber having an absorption peak at a third wavelength longer than the second wavelength.

13 Claims, 1 Drawing Sheet

(51) Int. Cl.
*B32B 27/16* (2006.01)
*B32B 27/32* (2006.01)

(52) U.S. Cl.
CPC ..... *B32B 2250/02* (2013.01); *B32B 2250/242* (2013.01); *B32B 2255/10* (2013.01); *B32B 2255/26* (2013.01); *B32B 2255/28* (2013.01); *B32B 2307/4026* (2013.01); *B32B 2307/412* (2013.01); *B32B 2307/712* (2013.01); *B32B 2451/00* (2013.01)

(56) References Cited

FOREIGN PATENT DOCUMENTS

| | | | |
|---|---|---|---|
| JP | 2009-101603 | A | 5/2009 |
| JP | 2021-185570 | A | 12/2021 |
| WO | 2020/203957 | A1 | 10/2020 |

OTHER PUBLICATIONS

Sep. 24, 2024 International Preliminary Report on Patentability issued in International Patent Application No. PCT/JP2023/012559.
Aug. 16, 2022 Office Action issued in Japanese Patent Application No. 2022-052607.
Nov. 17, 2025 Office Action issued in Taiwanese Application No. 112111829.

* cited by examiner

DECORATIVE SHEET AND DECORATIVE MATERIAL

TECHNICAL FIELD

The present disclosure relates to a decorative sheet and a decorative material.

BACKGROUND ART

Decorative sheets have been used to decorate or protect the surfaces of interior materials for buildings, exterior materials for buildings, furniture, architectural millwork, home appliances, and other products. Such a decorative sheet includes, for example, a surface protective layer on a substrate layer (see, for example, PTL 1).

Decorative sheets may be used outdoors or in other places where they are exposed to sunlight. When decorative sheets are used in places where they are exposed to sunlight, the decorative sheets may undergo color tone changes or resin degradation under UV light. For this reason, UV absorbers are added to the surface protective layer of decorative sheets to improve the weather resistance of the decorative sheets.

CITATION LIST

Patent Literature

PTL 1: Japanese Unexamined Patent Application Publication No. 2000-117905

SUMMARY OF INVENTION

Technical Problem

There have been studies on the use of polyolefin as a resin component for forming the substrate layer. However, polyolefin is easily degraded by UV light. The inventors of the present disclosure have found that a decorative sheet including a surface protective layer containing a UV absorber with a conventional formulation has resistance to resin degradation for a short term but fails to maintain enough resistance to resin degradation for a long term.

An object of the present disclosure is to improve the long-term weather resistance of a decorative sheet including a polyolefin-containing substrate layer.

Solution to Problem

A decorative sheet of the present disclosure is a decorative sheet for exterior materials including a substrate layer, a design layer, a transparent resin layer, and a surface protective layer in this order, wherein the substrate layer includes a polyolefin, the transparent resin layer includes a polyolefin, and the surface protective layer includes a cured resin, a first UV absorber having an absorption peak at a first wavelength, a second UV absorber having an absorption peak at a second wavelength longer than the first wavelength, and a third UV absorber having an absorption peak at a third wavelength longer than the second wavelength.

Advantageous Effects of Invention

According to the present disclosure, the long-term weather resistance of a decorative sheet including a polyolefin-containing substrate layer can be improved.

DESCRIPTION OF EMBODIMENTS

Figure 1:
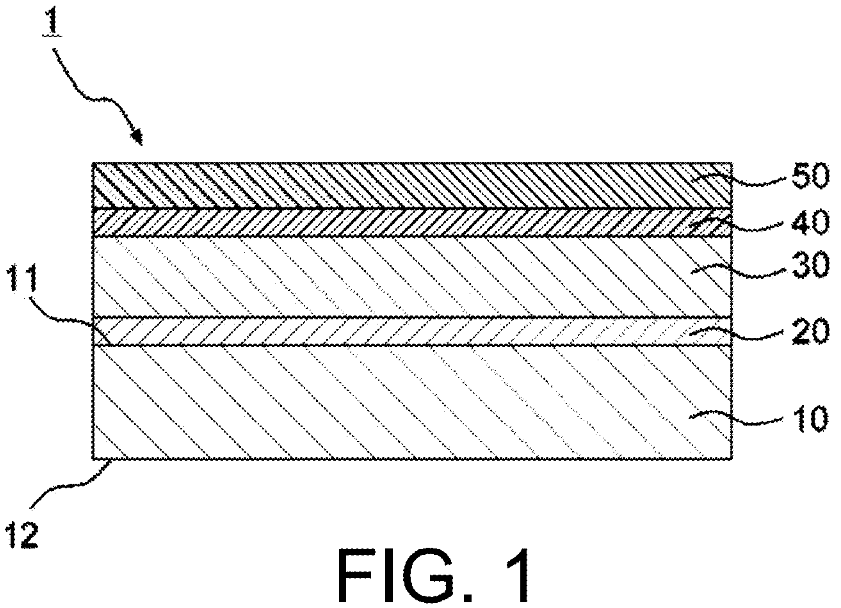
FIG. 1 is a schematic cross-sectional view of an embodiment of a decorative sheet of the present disclosure.

Embodiments of the present disclosure will be described below in detail. The present disclosure can be implemented in many different forms and is not construed as being limited to the description of the following exemplary embodiments. For clear description, the width, thickness, shape, or other features of each layer may be illustrated more schematically in the drawings than in the embodiments. However, the drawings are merely examples and do not limit the interpretation of the present disclosure. In this description and each of the drawings, elements similar to those already described in relation to the illustrated drawings may be assigned with the same reference characters, and detailed description may be omitted as appropriate.

The terms film and sheet may be used to refer to materials in order of increasing thickness, with thinner materials referred to as films and thicker ones as sheets. In the present disclosure, however, sheets encompass films, unless otherwise specified.

When there are multiple possible upper limits and multiple possible lower limits for a certain parameter in the present disclosure, the numerical range of the parameter may be composed of a combination of any one of the possible upper limits and any one of the possible lower limits. Examples of the parameter include physical properties, component content, and layer thickness. For example, the expression "Parameter B is preferably A1 or more, more preferably A2 or more, still more preferably A3 or more. Parameter B is preferably A4 or less, more preferably A5 or less, still more preferably A6 or less." will be described. In this example, the numerical range of the parameter B may be A1 or more and A4 or less, A1 or more and A5 or less, A1 or more and A6 or less, A2 or more and A4 or less, A2 or more and A5 or less, A2 or more and A6 or less, A3 or more and A4 or less, A3 or more and A5 or less, or A3 or more and A6 or less.

In the following description, each of the components described below (e.g., resin component, such as polyolefin, UV absorber, light stabilizer, colorant, and additives) may be used singly or in combination of two or more, unless otherwise specified.

A decorative sheet of the present disclosure includes a substrate layer, a design layer, a transparent resin layer, and a surface protective layer in this order. The substrate layer contains a polyolefin. The transparent resin layer contains a polyolefin.

The surface protective layer contains a cured resin, a first UV absorber having an absorption peak at a first wavelength, a second UV absorber having an absorption peak at a second wavelength longer than the first wavelength, and a third UV absorber having an absorption peak at a third wavelength longer than the second wavelength. The UV absorbers will be described below in detail. Having such a structure, the decorative sheet of the present disclosure can maintain its weather resistance over a long period of time in an environment exposed to direct sunlight.

A decorative sheet including a polyolefin-containing substrate layer, a design layer, a polyolefin-containing transparent resin layer, and a surface protective layer in this order tends to degrade under UV light. The inventors of the present disclosure have found that there are some cases in which a decorative sheet including a surface protective layer containing one or two UV absorbers has resistance to UV degradation for a short term but fails to maintain enough resistance to UV degradation for a long term. This may be based on the following reason. If the substrate layer or the transparent resin layer is exposed to UV irradiation for a long period of time, polyolefin gradually degrades, and the wavelengths of UV light absorbed by polyolefin gradually change so as to extend to, for example, the longer wavelength side. In the related art, a UV absorber that absorbs UV light with wavelengths to be absorbed before this change is selected and added to the surface protective layer. However, such a UV absorber fails to sufficiently absorb UV light with wavelengths to be absorbed after the change. Therefore, the UV degradation of the decorative sheet proceeds for a long period of time.

For example, a surface protective layer containing a large amount of one or two UV absorbers may also absorb UV light with the wavelengths to be absorbed after the change. In this case, however, there may be some problems associated with bleed-out of the UV absorbers and decreases in the adhesion (close contact) and transparency of the surface protective layer.

To solve such problems, the inventors of the present disclosure have found that a surface protective layer containing at least three UV absorbers having different wavelengths at their absorption peaks can improve the long-term weather resistance of the decorative sheet. This may be based on the following reason. A combinational use of three or more UV absorbers described above can cover a wide range of UV wavelengths. Even when the exposure of the substrate layer or the transparent resin layer to UV irradiation changes the wavelengths of light absorbed by polyolefin, the above UV absorbers can sufficiently absorb UV light in a wide wavelength range and can thus sufficiently absorb UV light with the wavelengths to be absorbed after the change, so that the surface protective layer can cut such UV light. Therefore, the decorative sheet has resistance to UV degradation over a long period of time. As a result, the decorative sheet can sufficiently maintain its weather resistance for a long time in an environment exposed to direct sunlight.

FIG. 1 is a schematic cross-sectional view of an embodiment of a decorative sheet of the present disclosure. A decorative sheet 1 has a substrate layer 10 including a first surface 11 and a second surface 12 opposite the first surface 11, and on the first surface 11 of the substrate layer 10, a design layer 20, a transparent resin layer 30, a primer layer 40, and a surface protective layer 50 in this order in the thickness direction. In other words, the substrate layer 10, the design layer 20, the transparent resin layer 30, the primer layer 40, and the surface protective layer 50 are stacked in the thickness direction, which is the vertical direction in the drawing of FIG. 1. The decorative sheet 1 may further include an adhesive layer, not shown, between the design layer 20 and the transparent resin layer 30. The decorative sheet 1 may further include an adhesive layer, not shown, on the second surface 12 of the substrate layer 10.

The decorative sheet of the present disclosure includes the substrate layer.

The substrate layer contains a polyolefin. Examples of the polyolefin include polyethylene, polypropylene, polybutene, and polymethylpentene. In one embodiment, the substrate layer contains polypropylene.

Examples of the polypropylene include propylene homopolymer; copolymers, such as ethylene-propylene copolymer, propylene-butene copolymer, and ethylene-propylene-butene copolymer. Of these, propylene homopolymer, ethylene-propylene copolymer, and propylene-butene copolymer are preferred.

From the viewpoint of processing suitability, the content ratio of the polyolefin in the substrate layer relative to all the resin components of the substrate layer is preferably 50 mass % or more, more preferably 60 mass % or more, still more preferably 70 mass % or more, yet still more preferably 80 mass % or more.

The substrate layer may contain additives. Examples of the additives include UV absorbers, light stabilizers, antioxidants, abrasion resistance improvers, IR absorbers, antistatic agents, fillers, foaming agents, flame retardants, plasticizers, anti-settling agents, lubricants, and colorants. Examples of the UV absorbers include benzotriazole UV absorbers, benzophenone UV absorbers, triazine UV absorbers, and hydroxyphenyltriazine UV absorbers. Examples of the light stabilizers include hindered amine light stabilizers, such as piperidinyl sebacate light stabilizers.

The substrate layer may be colorless and transparent, or may contain colorants, such as dyes and pigments. For example, when an adherend to which the decorative sheet is to be attached has uneven surface hue, the substrate layer may contain an inorganic pigment, such as a white pigment, to conceal the surface hue and improve the color tone stability of the design layer.

Examples of pigments include white pigments, such as zinc oxide, lead white, lithopone, titanium dioxide, precipitated barium sulfate, and barite; black pigments, such as carbon black; red pigments, such as lead tan and iron oxide red; yellow pigments, such as yellow lead and zinc yellow (zinc yellow, type 1 (zinc potassium chromate) and zinc yellow, type 2 (zinc tetroxy chromate)); and blue pigments, such as ultramarine blue and Prussian blue (ferric ferrocyanide).

The amount of the colorant relative to 100 parts by mass of the polyolefin in the substrate layer may be 1 part by mass or more, 3 parts by mass or more, 5 parts by mass or more, 50 parts by mass or less, 40 parts by mass or less, 30 parts by mass or less, and may be, for example, 1 part by mass or more and 50 parts by mass or less.

From the viewpoint of the balance between design quality and processing suitability, the thickness of the substrate layer is preferably 20 μm or more, more preferably 25 μm or more, still more preferably 30 μm or more, and preferably 150 μm or less, more preferably 120 μm or less, still more preferably 100 μm or less, and is, for example, 20 μm or more and 150 μm or less.

The substrate layer may be surface-treated on one or both sides. Examples of the surface treatments include physical surface treatments, such as oxidation methods and texturing methods, as well as chemical surface treatments. Examples of the oxidation methods include corona discharge treatment, chromium oxidation treatment, flame treatment, hot air treatment, and ozone-UV treatment. Examples of the texturing methods include sandblasting and solvent treatment. The substrate layer may have an easy adhesion layer on one or both sides. This configuration can improve, for example, the interlayer adhesion between the substrate layer and other layers.

The decorative sheet of the present disclosure includes the design layer.

In one embodiment, the design layer is disposed on the substrate layer. In other words, the decorative sheet includes the design layer stacked to the substrate layer in the thickness direction in this embodiment. The substrate layer may be in contact with the design layer, and another layer may be present between the substrate layer and the design layer.

The design layer is disposed to display the design expressed by the decorative sheet.

The design layer has, for example, a pattern. Examples of the pattern include wood grain patterns that imitate, for example, annual rings or xylem grooves on the surface of wood boards, stone patterns that imitate the surface of rocks, such as marble and granite, fabric patterns that imitate fabric texture or cloth-like designs, leather grain patterns that imitate the surface of leather, Nashiji (pear skin) patterns, tile patterns, brick bonding patterns, geometric patterns, as well as abstract patterns, such as letters, figures, symbols, polka dots, and flower patterns. The pattern may be a single solid color (so-called solid image). The pattern may be a composite pattern including two or more of these patterns. The design layer may have two or more layers. For example, the design layer may have a colored first layer and a second layer that forms a pattern on the first layer.

The design layer can be formed, for example, by a printing method or a coating method. Examples of the printing method include gravure printing, offset printing, silk screen printing, printing by transfer from a transfer sheet, and inkjet printing. Examples of the coating method include gravure coating, gravure reverse coating, gravure offset coating, spinner coating, roll coating, and reverse roll coating. Each of the layers described below can also be formed, for example, by these methods.

In one embodiment, the design layer contains a resin component and a colorant.

Examples of the resin component include vinyl chloride-vinyl acetate copolymer, vinyl chloride-vinyl acetate-(meth)acrylic copolymer, chlorinated polyethylene, chlorinated polypropylene, urethane-(meth)acrylic copolymer, (meth)acrylic resin, (meth)acrylic polyol resin, polystyrene, polyurethane, polyester, polyamide, butyral resin, nitrocellulose, and cellulose acetate.

Examples of the colorant include pigments and dyes. Specific examples include inorganic pigments, such as carbon black, iron black, titanium white, antimony white, yellow lead, titanium yellow, red iron oxide, cadmium red, ultramarine, and cobalt blue; organic pigments or dyes, such as quinacridone red, isoindolinone yellow, phthalocyanine blue, azomethine azoblack, and nickel azo complex; metal pigments composed of foil flakes of aluminum, brass, and other materials; and pearlescent (pearl) pigments composed of foil flakes of titanium dioxide-coated mica, basic lead carbonate, and other materials.

The amount of the colorant in the design layer relative to 100 parts by mass of the resin component contained in the design layer may be 5 parts by mass or more, 15 parts by mass or more, 30 parts by mass or more, and 200 parts by mass or less, 150 parts by mass or less, 100 parts by mass or less, and may be, for example, 5 parts by mass or more and 200 parts by mass or less.

The design layer may contain additives. Examples of the additives include UV absorbers, light stabilizers, antioxidants, fillers, defoamers, flame retardants, plasticizers, and lubricants. To improve weather resistance, the design layer may contain weathering agents, such as UV absorbers, light stabilizers, and antioxidants.

The thickness of the design layer is preferably 0.5 μm or more, more preferably 1 μm or more, still more preferably 2 μm or more, and preferably 20 μm or less, more preferably 15 μm or less, still more preferably 10 μm or less, and is, for example, 0.5 μm or more and 20 μm or less. This can further improve, for example, the design quality of the decorative sheet.

The design layer may have a metal thin film. Examples of the metal that constitutes the metal thin film include tin, indium, chromium, aluminum, nickel, iron, cobalt, copper, silver, gold, platinum, and zinc, and alloys containing at least one selected from these metals. Examples of the alloys include brass, bronze, and stainless steel. Examples of the method for forming the metal thin film include vacuum deposition, sputtering, and ion plating. The thickness of the metal thin film is, for example, 0.1 μm or more and 1 μm or less.

The decorative sheet of the present disclosure may include a concealing layer between the substrate layer and the design layer. The concealing layer can suppress, for example, the adverse effect of the substrate layer on the color tone or pattern of the decorative sheet.

The concealing layer may be an opaque color layer.

In one embodiment, the concealing layer contains a resin component and a colorant. The resin component and the colorant in the concealing layer can be appropriately selected from the resin components and the colorants described for the design layer, respectively, and the description of the resin component and the colorant in the concealing layer is omitted here.

The concealing layer may contain the additives described above.

The thickness of the concealing layer is, for example, 1 μm or more and 20 μm or less.

The decorative sheet of the present disclosure includes the transparent resin layer.

The transparent resin layer is located between the design layer and the surface protective layer.

The transparent resin layer contains a polyolefin. Examples of the polyolefin include polyethylene, polypropylene, polybutene, and polymethylpentene. In one embodiment, the transparent resin layer contains polypropylene. The polyolefin contained in the transparent resin layer may be the same as or different from the polyolefin contained in the substrate layer.

Examples of the polypropylene include propylene homopolymer; copolymers, such as ethylene-propylene copolymer, propylene-butene copolymer, and ethylene-propylene-butene copolymer. Of these, propylene homopolymer, ethylene-propylene copolymer, and propylene-butene copolymer are preferred.

From the viewpoint of processing suitability, the content ratio of the polyolefin in the transparent resin layer relative to all the resin components of the transparent resin layer is preferably 50 mass % or more, more preferably 60 mass % or more, still more preferably 70 mass % or more, yet still more preferably 80 mass % or more.

The transparent resin layer may contain UV absorbers, such as the first to third UV absorbers described below. The transparent resin layer may contain the light stabilizers described below. The transparent resin layer may contain the additives described above.

The amount of the UV absorbers in the transparent resin layer relative to 100 parts by mass of the polyolefin contained in the transparent resin layer may be 0.05 parts by mass or more, 0.10 parts by mass or more, and 10 parts by mass or less, 5 parts by mass or less, and may be, for example, 0.05 parts by mass or more and 10 parts by mass or less.

The amount of the light stabilizer in the transparent resin layer relative to 100 parts by mass of the polyolefin contained in the transparent resin layer may be 0.1 parts by mass or more, 0.5 parts by mass or more, and 10 parts by mass or less, 8 parts by mass or less, and may be, for example, 0.1 parts by mass or more and 10 parts by mass or less.

The transparent resin layer only needs to be transparent enough to see the layers on the substrate layer side from the transparent resin layer, and may be colorless and transparent, colored transparent, or translucent.

From the viewpoint of the balance of scratch resistance, processing suitability, and weather resistance, the thickness of the transparent resin layer may be 20 μm or more, 40 μm or more, 60 μm or more, and 150 μm or less, 120 μm or less, or 100 μm or less, and may be, for example, 20 μm or more and 150 μm or less. To protect the design layer and improve the scratch resistance, the transparent resin layer is preferably thicker than the substrate layer.

The decorative sheet of the present disclosure includes the surface protective layer.

The surface protective layer is disposed on the transparent resin layer. In other words, the surface protective layer is stacked to the transparent resin layer in the thickness direction. In one embodiment, the surface protective layer is disposed over the entire surface of the transparent resin layer. The surface protective layer forms the outermost layer on one side of the decorative sheet in one embodiment. The surface protective layer can improve, for example, the heat resistance, scratch resistance, and dirt resistance of the decorative sheet.

The surface protective layer includes a cured resin.

The cured resin functions as, for example, a binder in the surface protective layer. Examples of the cured resin include a cured product of a curable compound. Examples of the cured product of the curable compound include a cured product of an ionizing radiation-curable compound and a cured product of a thermosetting resin. The surface protective layer may contain two or more of these cured resins.

Examples of the thermosetting resin include unsaturated group-containing (meth)acrylic resins, unsaturated polyester, urethane resin, epoxy resin, phenolic resin, amino-alkyd resin, urea resin, melamine resin, melamine-urea co-condensation resin, guanamine resin, diallyl phthalate resin, and silicone resin.

The thermosetting resin is used together with a curing agent as necessary. Unsaturated group-containing (meth) acrylic resins and unsaturated polyester are used together with, for example, a peroxide, such as methyl ethyl ketone peroxide, or a radical initiator, such as azoisobutyronitrile. Urethane resin is used together with, for example, an isocyanate curing agent. Epoxy resin is used together with, for example, an organic amine curing agent.

Examples of the thermosetting resin include a two-component curable urethane resin containing a polyol as a main component and an isocyanate compound as a curing agent. Examples of the polyol include (meth)acrylic polyols, polyether polyol, polyester polyol, polyethylene glycol, and polypropylene glycol. Isocyanate compounds are polyvalent isocyanates having two or more isocyanate groups. Examples of the isocyanate compounds include aromatic isocyanates, such as 4,4-diphenylmethane diisocyanate; and aliphatic (or alicyclic) isocyanates, such as hexamethylene diisocyanate, isophorone diisocyanate, hydrogenated tolylene diisocyanate, and hydrogenated diphenylmethane diisocyanate.

In one embodiment, the surface protective layer contains a cured product of a thermosetting resin as a cured resin. The surface protective layer contains, for example, a cross-linked cured product of a (meth)acrylic polyol cured by using an isocyanate curing agent.

An ionizing radiation-curable compound means a compound that can be cross-linked and cured by exposure to ionizing radiation, and has an ionizing radiation-curable functional group. The ionizing radiation-curable functional group is a group that can be cross-linked by exposure to ionizing radiation. Examples of the ionizing radiation-curable functional group include ethylenic double bond-containing functional groups (ethylenically unsaturated groups), such as (meth)acryloyl groups, vinyl groups, and allyl groups. Ionizing radiation means electromagnetic waves or charged particle beams that have an energy quantum capable of polymerizing or cross-linking molecules. Examples of the ionizing radiation include electron beams (EB) and UV light (UV) and also include electromagnetic waves, such as X-rays and γ-rays, and charged particle beams, such as x-rays and ion beams. Since the surface protective layer contains UV absorbers, electron beams are preferred as ionizing radiation.

Examples of the ionizing radiation-curable compound include polymerizable monomers and polymerizable oligomers that have been used as ionizing radiation-curable compounds in the related art.

The polymerizable monomers are preferably (meth)acrylate monomers having a (meth)acryloyl group in the molecule, more preferably multifunctional (meth)acrylate monomers having two or more (meth)acryloyl groups in the molecule. The number of (meth)acryloyl groups in the multifunctional (meth)acrylate monomers is 2 or more, and preferably 8 or less, more preferably 6 or less.

Examples of the polymerizable monomers include bifunctional (meth)acrylates, such as ethylene glycol di(meth) acrylate, propylene glycol di(meth)acrylate, 1,4-butanediol di(meth)acrylate, 1,6-hexanediol di(meth)acrylate, bisphenol A tetraethoxy di(meth)acrylate, and bisphenol A tetrapropoxy di(meth)acrylate; trifunctional or higher (meth)acrylates, such as trimethylolpropane tri(meth)acrylate, pentaerythritol tri(meth)acrylate, pentaerythritol tetra(meth) acrylate, dipentaerythritol tri(meth)acrylate, dipentaerythritol tetra(meth)acrylate, dipentaerythritol penta(meth)acrylate, and dipentaerythritol hexa(meth)acrylate; and ethylene oxide-modified products, propylene oxide-modified products, caprolactone-modified products, isocyanuric acid-modified products, and propionic acid-modified products of these (meth)acrylates.

Examples of the polymerizable oligomers include (meth) acrylate oligomers having two or more (meth)acryloyl groups in the molecule. Examples of the (meth)acrylate oligomers include urethane (meth)acrylate, epoxy (meth) acrylate, polyester (meth)acrylate, polyether (meth)acrylate, polycarbonate (meth)acrylate, polycaprolactone urethane (meth)acrylate, polycaprolactone diol urethane (meth)acrylate, and acrylic (meth)acrylate. The number of (meth) acryloyl groups in the polymerizable oligomers is 2 or more, and preferably 8 or less, more preferably 6 or less.

Examples of the polymerizable oligomers further include highly hydrophobic polybutadiene (meth)acrylate oligomers having a (meth)acryloyl group on the side chains of the polybutadiene oligomers, and silicone (meth)acrylate oligomers having a polysiloxane bond on the main chain.

The weight-average molecular weight of the polymerizable oligomers may be 500 or more, 1,000 or more, 2,000 or more, and 10,000 or less, 8,000 or less, 6,000 or less, and may be, for example, 500 or more and 10,000 or less. The weight-average molecular weight is the average molecular weight measured by gel permeation chromatography (GPC) analysis and converted to standard polystyrene.

As ionizing radiation-curable compounds, a monofunctional (meth)acrylate may be used as necessary in combination with a multifunctional (meth)acrylate to reduce the viscosity of the curable composition during coating. Examples of the monofunctional (meth)acrylate include methyl (meth)acrylate, ethyl (meth)acrylate, propyl (meth) acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, and isobornyl (meth)acrylate.

When the ionizing radiation-curable compound is a UV-curable compound, the UV-curable compound is preferably used together with at least one selected from photopolymerization initiators and photopolymerization accelerators.

To improve the heat resistance, scratch resistance, and dirt resistance of the surface protective layer, the surface protective layer preferably contains a cured product of a curable compound, more preferably contains a cured product of an ionizing radiation-curable compound. Of ionizing radiation-curable compounds, an electron beam-curable compound is preferred as a component of the surface protective layer because the electron beam-curable compound allows a solvent-free system, does not require any photopolymerization initiator, and provides stable curing properties. Of ionizing radiation-curable compounds, polymerizable oligomers are preferred, (meth)acrylate oligomers having two or more (meth)acryloyl groups in the molecule are more preferred, and urethane (meth)acrylate is still more preferred.

The content ratio of the cured resin to all the resin components contained in the surface protective layer is preferably 50 mass % or more, more preferably 70 mass % or more, still more preferably 80 mass % or more, particularly preferably 90 mass % or more.

The surface protective layer includes a first UV absorber having an absorption peak at a first wavelength, a second UV absorber having an absorption peak at a second wavelength longer than the first wavelength, and a third UV absorber having an absorption peak at a third wavelength longer than the second wavelength. Each absorption peak is based on the absorbance spectrum measured using a UV-visible-near-infrared spectrophotometer.

The first UV absorber has an absorption peak at the first wavelength. The first wavelength is preferably in the range of 270 nm or more to 300 nm or less, more preferably in the range of 270 nm or more to 290 nm or less, still more preferably in the range of 270 nm or more to 280 nm or less.

The second UV absorber has an absorption peak at the second wavelength. The second wavelength is preferably in the range of 310 nm or more to 330 nm or less, more preferably in the range of 310 nm or more to 325 nm or less.

The third UV absorber has an absorption peak at the third wavelength. The third wavelength is preferably in the range of 340 nm or more to 370 nm or less, more preferably in the range of 345 nm or more to 365 nm or less.

The above absorption peaks preferably mean the maximum absorption peaks in the wavelength range of 270 nm or more to 380 nm or less. For example, when the first UV absorber has multiple absorption peaks in the above wavelength range, the maximum absorption peak is preferably in the range of 270 nm or more to 300 nm or less.

The difference between the second wavelength and the first wavelength is preferably 10 nm or more, more preferably 20 nm or more, still more preferably 30 nm or more, and preferably 60 nm or less, more preferably 55 nm or less, still more preferably 50 nm or less, and is, for example, 10 nm or more and 60 nm or less.

The difference between the third wavelength and the second wavelength is preferably 10 nm or more, more preferably 20 nm or more, still more preferably 30 nm or more, and preferably 60 nm or less, more preferably 55 nm or less, still more preferably 50 nm or less, and is, for example, 10 nm or more and 60 nm or less.

The difference between the third wavelength and the first wavelength is preferably 40 nm or more, more preferably 50 nm or more, still more preferably 60 nm or more, and preferably 100 nm or less, more preferably 95 nm or less, still more preferably 90 nm or less, and is, for example, 40 nm or more and 100 nm or less.

The first and second UV absorbers may contribute to the suppression of resin degradation in early stages.

The second and third UV absorbers may contribute to the suppression of resin degradation for a long term.

Examples of the first to third UV absorbers include triazine UV absorbers, benzotriazole UV absorbers, and benzophenone UV absorbers. Triazine UV absorbers are preferred from the viewpoint of high weather resistance, absorbance, and wavelength selectivity.

Of triazine UV absorbers, hydroxyphenyltriazine UV absorbers are preferred from the viewpoint of weather resistance. Examples of the hydroxyphenyltriazine UV absorbers include compounds represented by formula (1), compounds represented by formula (2), and compounds represented by formula (3).

[Chem. 1]

(1)

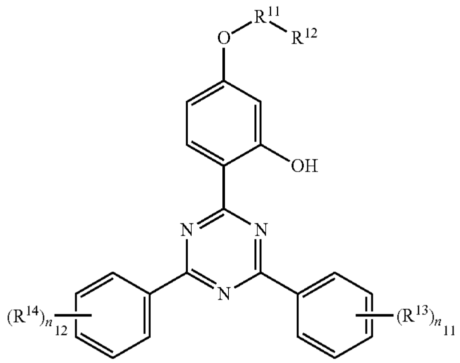

In formula (1), $R^{11}$ is a divalent organic group, $R^{12}$ is an acyloxy group represented by —O—C(=O) $R^{15}$, $R^{13}$ and $R^{14}$ are each independently a monovalent organic group, $R^{15}$ is a hydrogen atom or a monovalent organic group, $n_{11}$ and $n_{12}$ are each independently an integer of 0 or more and 5 or less. If there are two or more $R^{13}$s, $R^{13}$s may be the same or different. If there are two or more $R^{14}$s, $R^{14}$s may be the same or different.

Examples of the divalent organic group $R^{11}$ include aliphatic hydrocarbon groups, such as alkylene groups and alkenylene groups. Alkylene groups are preferred from the viewpoint of weather resistance. The number of carbon atoms in the aliphatic hydrocarbon groups is preferably 1 or more, more preferably 2 or more, and preferably 16 or less, more preferably 12 or less, still more preferably 8 or less, particularly preferably 4 or less, and is, for example, 1 or more and 16 or less, from the viewpoint of weather resistance. The aliphatic hydrocarbon groups may be linear, branched, or cyclic, and from the viewpoint of weather resistance, preferably linear or branched, more preferably linear.

Examples of the monovalent organic groups $R^{13}$ and $R^{14}$ include aliphatic hydrocarbon groups, such as alkyl groups, alkenyl groups, and cycloalkyl groups; and aromatic ring-containing hydrocarbon groups, such as aryl groups and arylalkyl groups. From the viewpoint of weather resistance, aromatic ring-containing hydrocarbon groups are preferred, aryl groups are more preferred, and phenyl groups are particularly preferred.

From the viewpoint of weather resistance, $n_{11}$ and $n_{12}$ are each preferably 0.

From the viewpoint of weather resistance, $R^{15}$ is preferably a monovalent organic group. Examples of the monovalent organic group include aliphatic hydrocarbon groups, such as alkyl groups, alkenyl groups, and cycloalkyl groups; and aromatic ring-containing hydrocarbon groups, such as aryl groups and arylalkyl groups. From the viewpoint of weather resistance, aliphatic hydrocarbon groups are preferred, and alkyl groups are more preferred. The number of carbon atoms in the aliphatic hydrocarbon groups is preferably 2 or more, more preferably 4 or more, and preferably 16 or less, more preferably 12 or less, still more preferably 10 or less, and is, for example, 2 or more and 16 or less, from the viewpoint of weather resistance. The aliphatic hydrocarbon groups may be linear, branched, or cyclic, and from the viewpoint of weather resistance, preferably linear or branched.

[Chem. 2]

(2)

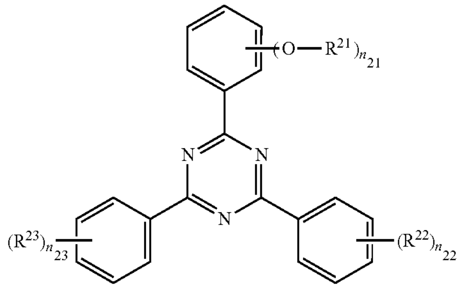

In formula (2), $R^{21}$ is a hydrogen atom or a monovalent organic group, $R^{22}$ and $R^{23}$ are each independently a hydroxyl group or a monovalent organic group, and $n_{21}$, $n_{22}$, and $n_{23}$ are each independently an integer of 1 or more and 5 or less. If there are two or more $R^{21}$s, $R^{21}$s may be the same or different. If there are two or more $R^{22}$s, $R^{22}$s may be the same or different. If there are two or more $R^{23}$s, $R^{23}$s may be the same or different.

Examples of the monovalent organic group $R^{21}$ include the groups listed as examples of the monovalent organic groups $R^{13}$ and $R^{14}$ in formula (1) and further include groups represented by $-R^{24}-C(=O)O-R^{25}$. $R^{24}$ is a divalent organic group, and $R^{25}$ is a monovalent organic group. Examples of the monovalent organic groups $R^{22}$ and $R^{23}$ include the groups listed as examples of the monovalent organic groups $R^{13}$ and $R^{14}$ in formula (1). From the viewpoint of weather resistance, aromatic ring-containing hydrocarbon groups are preferred, aryl groups are more preferred, and phenyl groups are particularly preferred.

Examples of the divalent organic group $R^{24}$ include the groups listed as examples of the divalent organic group $R^{11}$ in formula (1). From the viewpoint of weather resistance, aliphatic hydrocarbon groups are preferred, and alkylene groups are more preferred. The number of carbon atoms in the aliphatic hydrocarbon groups is preferably 1 or more, more preferably 2 or more, and preferably 16 or less, more preferably 12 or less, still more preferably 8 or less, particularly preferably 4 or less, and is, for example, 1 or more and 16 or less, from the viewpoint of weather resistance. The aliphatic hydrocarbon groups may be linear, branched, or cyclic, and from the viewpoint of weather resistance, preferably linear or branched, more preferably linear.

Examples of the monovalent organic group $R^{25}$ include the groups listed as examples of the monovalent organic group $R^{15}$ in formula (1). From the viewpoint of weather resistance, aliphatic hydrocarbon groups are preferred, and alkyl groups are more preferred. The number of carbon atoms in the aliphatic hydrocarbon groups is preferably 2 or more, more preferably 4 or more, and preferably 16 or less, more preferably 12 or less, still more preferably 10 or less, and is, for example, 2 or more and 16 or less, from the viewpoint of weather resistance. The aliphatic hydrocarbon groups may be linear, branched, or cyclic, and from the viewpoint of weather resistance, preferably linear or branched.

$n_{21}$ may be 2 or more, and $n_{22}$ and $n_{23}$ may each be 1. In this case, one of $R^{21}$s may be a hydrogen atom, and if $R^{22}$ and $R^{23}$ are monovalent organic groups, $R^{22}$ and $R^{23}$ may be the same organic group.

[Chem. 3]

(3)

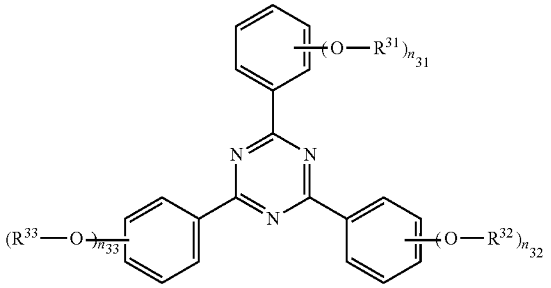

In formula (3), $R^{31}$, $R^{32}$, and $R^{33}$ are each independently a hydrogen atom or a monovalent organic group, and $n_{31}$, $n_{32}$, and $n_{33}$ are each independently an integer of 1 or more and 5 or less. If there are two or more $R^{31}$s, $R^{31}$s may be the same or different. If there are two or more $R^{32}$s, $R^{32}$s may be the same or different. If there are two or more $R^{33}$s, $R^{33}$s may be the same or different.

Examples of the monovalent organic groups $R^{31}$, $R^{32}$, and $R^{33}$ include the groups listed as examples of the monovalent organic groups $R^{13}$ and $R^{14}$ in formula (1) and further include groups represented by $-R^{34}-C(=O)O-R^{35}$. $R^{34}$ is a divalent organic group, and $R^{35}$ is a monovalent organic group.

Examples of the divalent organic group $R^{34}$ include the groups listed as examples of the divalent organic group $R^{11}$ in formula (1). From the viewpoint of weather resistance, aliphatic hydrocarbon groups are preferred, and alkylene groups are more preferred. The number of carbon atoms in the aliphatic hydrocarbon groups is preferably 1 or more, more preferably 2 or more, and preferably 16 or less, more preferably 12 or less, still more preferably 8 or less, particularly preferably 4 or less, and is, for example, 1 or more and 16 or less, from the viewpoint of weather resistance. The aliphatic hydrocarbon groups may be linear, branched, or cyclic, and from the viewpoint of weather resistance, preferably linear or branched, more preferably linear.

Examples of the monovalent organic group $R^{35}$ include the groups listed as examples of the monovalent organic group $R^{15}$ in formula (1). From the viewpoint of weather resistance, aliphatic hydrocarbon groups are preferred, and alkyl groups are more preferred. The number of carbon atoms in the aliphatic hydrocarbon groups is preferably 2 or more, more preferably 4 or more, and preferably 16 or less, more preferably 12 or less, still more preferably 10 or less, and is, for example, 2 or more and 16 or less, from the viewpoint of weather resistance. The aliphatic hydrocarbon groups may be linear, branched, or cyclic, and from the viewpoint of weather resistance, preferably linear or branched.

$n_{31}$, $n_{32}$, and $n_{33}$ may each be 2 or more. In this case, one of $R^{31}$s may be a hydrogen atom, one of $R^{32}$s may be a hydrogen atom, and one of $R^{33}$s may be a hydrogen atom.

Specific examples of the hydroxyphenyltriazine UV absorbers include 2-(2-hydroxy-4-[1-octyloxycarbonylethoxy]phenyl)-4,6-bis(4-phenylphenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, 2,4-bis[2-hydroxy-4-butoxyphenyl]-6-(2,4-dibutoxyphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-(4,6-diphenyl-1,3,5-triazin-2-yl)-5-[2-(2-ethylhexanoyloxy) ethoxy]phenol, 2-[4-[(2-hydroxy-3-(2'-ethyl) hexyl) oxy]-2-hydroxyphenyl]-4,6-bis(2,4-dimethylphenyl)-1,3,5-triazine, and compounds represented by the following formula.

[Chem. 4]

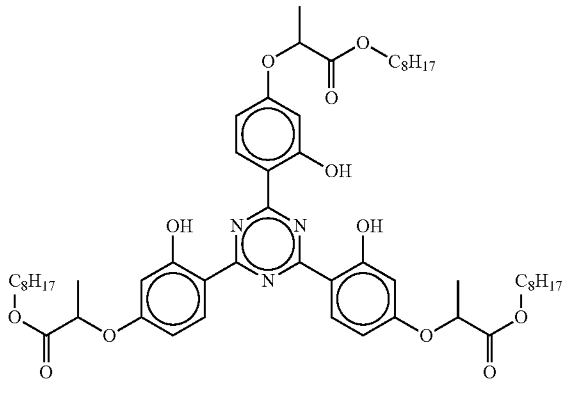

In the surface protective layer, the total amount of the first UV absorber, the second UV absorber, and the third UV absorber relative to 100 parts by mass of the cured resin is preferably 0.5 parts by mass or more, more preferably 1 part by mass or more, still more preferably 2 parts by mass or more, and preferably 10 parts by mass or less, more preferably 8 parts by mass or less, still more preferably 6 parts by mass or less, and is, for example, 0.5 parts by mass or more and 10 parts by mass or less. When the total amount of the UV absorbers is the lower limit or more, the decorative sheet tends to have higher weather resistance. When the total amount of the UV absorbers is the upper limit or less, the UV absorbers are less likely to bleed out.

In the surface protective layer, the amount of the first UV absorber relative to 100 parts by mass of the cured resin is preferably 0.1 parts by mass or more, more preferably 0.2 parts by mass or more, still more preferably 0.3 parts by mass or more, and preferably 3 parts by mass or less, more preferably 2 parts by mass or less, still more preferably 1.5 parts by mass or less, and is, for example, 0.1 parts by mass or more and 3 parts by mass or less. This tends to further improve, for example, the initial weather resistance.

In the surface protective layer, the amount of the second UV absorber relative to 100 parts by mass of the cured resin is preferably 0.1 parts by mass or more, more preferably 0.5 parts by mass or more, still more preferably 1 part by mass or more, and preferably 8 parts by mass or less, more preferably 6 parts by mass or less, still more preferably 5 parts by mass or less, and is, for example, 0.1 parts by mass or more and 8 parts by mass or less. This tends to further improve, for example, the initial and long-term weather resistance.

In the surface protective layer, the amount of the third UV absorber relative to 100 parts by mass of the cured resin is preferably 0.1 parts by mass or more, more preferably 0.2 parts by mass or more, still more preferably 0.3 parts by mass or more, and preferably 3 parts by mass or less, more preferably 2 parts by mass or less, still more preferably 1.5 parts by mass or less, and is, for example, 0.1 parts by mass or more and 3 parts by mass or less. This tends to further improve, for example, the long-term weather resistance.

In the surface protective layer, the amount of the second UV absorber is larger than that of the first UV absorber and larger than that of the third UV absorber in one embodiment. The surface protective layer can thus absorb light with a wider range of wavelengths and tends to further improve, for example, the initial and long-term weather resistance.

The surface protective layer may contain a light stabilizer from the viewpoint of weather resistance.

Examples of the light stabilizer include aromatic light stabilizers, amine light stabilizers, organic acid light stabilizers, catechin light stabilizers, and hindered amine light stabilizers. Of these light stabilizers, hindered amine light stabilizers are preferred. Hindered amine light stabilizers are, for example, compounds having a structure containing a 2,2,6,6-tetramethylpiperidine skeleton in the molecule.

Examples of the light stabilizer include reactive light stabilizers having an ethylenic double bond polymerizable with a curable compound that may form the cured resin in the surface protective layer, and non-reactive light stabilizers having no ethylenic double bond polymerizable with the curable compound. The ethylenic double bond is possessed by functional groups, such as (meth)acryloyl groups, vinyl groups, and allyl groups. The surface protective layer may contain at least one selected from reactive light stabilizers and non-reactive light stabilizers, or may contain a reactive light stabilizer and a non-reactive light stabilizer.

The reactive light stabilizer is typically incorporated into and fixed in the cured resin in forming the surface protective layer and can thus exhibit a long-term effect. The non-reactive light stabilizer can move in the surface protective layer and can thus exhibit an immediate effect.

The number of ethylenic double bonds in the reactive light stabilizer may be one or two or more.

Examples of reactive light stabilizers having one ethylenic double bond include 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloylamino-1,2,2,6,6-pentamethylpiperidine, 4-cyano-4-(meth)acryloylamino-2, 2,6,6-tetramethylpiperidine, 4-crotonoyloxy-2,2,6,6-tetramethylpiperidine and 4-crotonoylamino-2,2,6,6-tetramethylpiperidine, pentamethylpiperidinyl (meth) acrylate, the compound with CAS number 1010692-24-6, and the compound with CAS number 1010692-21-3. Examples of reactive light stabilizers having two or more ethylenic double bonds include 1-(meth)acryloyl-4-(meth) acryloylamino-2,2,6,6-tetramethylpiperidine, 1-(meth)acryloyl-4-cyano-4-(meth)acryloylamino-2,2,6,6-tetramethylpiperidine, 1-crotonoyl-4-crotoyloxy-2,2,6,6-tetramethylpiperidine, the compound with CAS number 1954659-42-7, and the compound with CAS number 1010692-23-5.

Examples of non-reactive light stabilizers include 4-benzoyloxy-2,2,6,6-tetramethylpiperidine, bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidinyl) sebacate, bis(1,2,2,6,6-pentamethyl-4-piperidinyl) sebacate, methyl (1,2,2,6,6-pentamethyl-4-piperidinyl) sebacate, 2,4-bis [N-butyl-N-(1-cyclohexyloxy-2,2,6,6-tetramethyl-4-piperidinyl)amino]-6-(2-hydroxyethylamine)-1,3,5-triazine), tetrakis(1,2,2,6,6-pentamethyl-4-piperidyl)-1,2,3,4-butanetetracarboxylate, and bis-(1,2,2,6,6-pentamethyl-4-piperidyl)-2-(3,5-di-t-butyl-4-hydroxy-benzyl)-2-n-butylmalonate.

In the surface protective layer, the amount of the light stabilizer relative to 100 parts by mass of the cured resin is preferably 0.5 parts by mass or more, more preferably 1 part by mass or more, still more preferably 1.5 parts by mass or more, and preferably 10 parts by mass or less, more preferably 8 parts by mass or less, still more preferably 6 parts by mass or less, and is, for example, 0.5 parts by mass or more and 10 parts by mass or less.

The surface protective layer preferably contains the above reactive light stabilizer and the above non-reactive light stabilizer. The blending ratio (reactive light stabilizer:non-reactive light stabilizer) of the above reactive light stabilizer to the above non-reactive light stabilizer in the surface protective layer on a mass basis is preferably from 8:2 to 0:10.

The surface protective layer may contain additives, such as antioxidants, abrasion resistance improvers, infrared absorbers, antistatic agents, leveling agents, thixotropic agents, coupling agents, defoamers, flame retardants, plasticizers, particles, and blocking inhibitors.

The surface protective layer is preferably substantially free of polyolefin. This tends to further improve, for example, the weather resistance of the surface protective layer. The phrase "substantially free of polyolefin" means that the content ratio of the polyolefin to all the resin components contained in the surface protective layer is 1 mass % or less. The content ratio of the polyolefin to all the resin components is preferably 0.1 mass % or less, more preferably 0.01 mass % or less, still more preferably 0 mass %.

In the decorative sheet of the present disclosure, the surface protective layer has an absorbance A1 of 0.3 or higher at a wavelength of 270 nm or more and 300 nm or less, an absorbance A2 of 0.6 or higher at a wavelength of 310 nm or more and 330 nm or less, and an absorbance A3 of 0.2 or higher at a wavelength of 340 nm or more and 370 nm or less.

Polyolefin tends to degrade when absorbing UV light with wavelengths of 270 nm or more and 300 nm or less. When the UV cut-off rate for UV light with wavelengths of 270 nm or more and 300 nm or less is high, the polyolefin is unlikely to degrade in each of the substrate layer and the transparent resin layer, which can improve the weather resistance of the decorative sheet. The decorative sheet including the substrate layer and the transparent resin layer each containing polyolefin has higher weather resistance when the absorbance A2 at a wavelength of 310 nm or more and 330 nm or less and the absorbance A3 at a wavelength of 340 nm or more and 370 nm or less are considered in addition to the absorbance A1 from the viewpoint of the long-term weather resistance as described above.

The absorbance A1 is preferably 0.3 or more, more preferably 0.35 or more and may be, for example, 0.5 or more or 0.7 or more. The upper limit of the absorbance A1 is not limited, but may be, for example, 1.5.

The absorbance A2 is preferably 0.6 or more, more preferably 0.7 or more and may be, for example, 1.0 or more or 1.2 or more. The upper limit of the absorbance A2 is not limited, but may be, for example, 3.0.

The absorbance A3 is preferably 0.2 or more, more preferably 0.25 or more. The upper limit of the absorbance A3 is not limited, but may be, for example, 1.5.

The absorbances A1, A2 and A3 can be adjusted by, for example, changing the amounts of the first to third UV absorbers in the surface protective layer and the thickness of the surface protective layer. For example, the absorbance can be easily adjusted by the surface protective layer containing the first to third UV absorbers.

In one embodiment, the absorbance of the surface protective layer in the wavelength range of 270 nm or more to 370 nm or less includes a maximum value in the range of 300 nm or more to 340 nm or less. This tends to further improve, for example, the long-term weather resistance of the decorative sheet.

Each absorbance is measured as follows.

The average absorbance of the surface protective layer at wavelength range of 270 nm or more to 300 nm or less in accordance with JIS K 0115:2004 is defined as the absorbance A1. The average absorbance is obtained by measuring the absorbance at 1 nm intervals in the wavelength range of 270 nm or more to 300 nm or less.

The average absorbance of the surface protective layer at wavelength range of 310 nm or more to 330 nm or less in accordance with JIS K 0115:2004 is defined as the absorbance A2. The average absorbance is obtained by measuring the absorbance at 1 nm intervals in the wavelength range of 310 nm or more to 330 nm or less.

The average absorbance of the surface protective layer at wavelength range of 340 nm or more to 370 nm ore less in accordance with JIS K 0115:2004 is defined as the absorbance A3. The average absorbance is obtained by measuring the absorbance at 1 nm intervals in the wavelength range of 340 nm or more to 370 nm or less.

The absorbance of the surface protective layer of the decorative sheet can be measured as follows. In the decorative sheet including the substrate layer, the design layer, the transparent resin layer, and the surface protective layer in this order, a laminate portion including the substrate layer and the design layer is separated from a laminate portion including the transparent resin layer and the surface protective layer. The absorbance of the laminate portion including the transparent resin layer and the surface protective layer is measured. Next, the surface protective layer in the laminate portion is removed by using a solvent or the like, and the absorbance of the remainder is measured. The absorbance of the remainder is subtracted from the absorbance of the laminate portion to obtain the absorbance of the surface protective layer.

In the decorative sheet of the present disclosure, the absorbance A4 of the laminate portion including the transparent resin layer and the surface protective layer in the wavelength range of 280 nm or more to 350 nm or less is preferably 0.2 or higher. This can further improve the long-term weather resistance of the decorative sheet. When the decorative sheet further includes the primer layer, the above laminate portion includes the transparent resin layer, the primer layer, and the surface protective layer. The absorbance A4 may be, for example, 1.0 or more, 2.0 or more, 3.0 or more, or 3.5 or more. The upper limit of the absorbance A4 is not limited, but may be, for example, 5.0.

The average absorbance of the above laminate portion at wavelength range of 280 nm or more to 350 nm or less in accordance with JIS K 0115:2004 is defined as absorbance A4. The average absorbance is obtained by measuring the absorbance at 1 nm intervals in the wavelength range of 280 nm or more to 350 nm or less.

In one embodiment, the surface protective layer can be formed by preparing a curable composition, applying the composition to the transparent resin layer or the primer layer to form an uncured resin layer, and cross-linking and curing the uncured resin layer. For example, the cross-linking curing is carried out by heat treatment in the case of using a thermosetting resin, and the cross-linking curing is carried out by exposure to ionizing radiation, such as electron beams and UV light, in the case of using an ionizing radiation-curable compound.

When electron beams are used as ionizing radiation, the exposure dose is, for example, 5 kGy or more and 300 kGy or less (0.5 Mrad or more and 30 Mrad or less), preferably 10 kGy or more and 100 kGy or less (1 Mrad or more and 10 Mrad or less). When UV light is used as ionizing radiation, rays including UV light with wavelengths from 190 nm or more to 380 nm or less may be emitted.

From the viewpoint of the balance of processability, scratch resistance, and weather resistance, the thickness of the surface protective layer is preferably 1 μm or more, more preferably 1.5 μm or more, still more preferably 2 μm or more, and preferably 20 μm or less, more preferably 15 μm or less, still more preferably 10 μm or less, and is, for example, 1 μm or more and 20 μm or less.

The decorative sheet of the present disclosure may include the primer layer between the transparent resin layer and the surface protective layer. The primer layer can be provided as necessary for the purpose of, for example, improving the adhesion between the transparent resin layer and the surface protective layer.

In one embodiment, the primer layer contains a resin component.

Examples of the resin component include vinyl chloride-vinyl acetate copolymer, vinyl chloride-vinyl acetate-(meth) acrylic copolymer, chlorinated polyethylene, chlorinated polypropylene, urethane-(meth)acrylic copolymer, (meth) acrylic resin, (meth)acrylic polyol resin, polystyrene, polyurethane, polyester, polyamide, butyral resin, nitrocellulose, and cellulose acetate. The resin component may be a cross-linked cured product of such a resin cured by using a curing agent. The resin component may be, for example, a cured product of the two-component curable urethane resin described above.

The primer layer may contain UV absorbers, such as the first to third UV absorbers described above. The primer layer may contain the light stabilizers described above. The primer layer may contain the additives described above.

When the primer layer contains a UV absorber, the amount of the UV absorber in the primer layer relative to 100 parts by mass of the resin component contained in the primer layer may be 1 part by mass or more, 5 parts by mass or more, 7 parts by mass or more, and 40 parts by mass or less, 30 parts by mass or less, 25 parts by mass or less, and may be, for example, 1 part by mass or more and 40 parts by mass or less.

When the primer layer contains a light stabilizer, the amount of the light stabilizer in the primer layer relative to 100 parts by mass of the resin component contained in the primer layer may be 0.1 parts by mass or more, 0.5 parts by mass or more, 1 part by mass or more, and 10 parts by mass or less, 8 parts by mass or less, 6 parts by mass or less, and may be, for example, 0.1 parts by mass or more and 10 parts by mass or less.

The thickness of the primer layer is preferably 0.1 μm or more, more preferably 0.5 μm or more, still more preferably 1 μm or more, and preferably 10 μm or less, more preferably 8 μm or less, still more preferably 6 μm or less, and is, for example, 0.1 μm or more and 10 μm or less.

The decorative sheet of the present disclosure may include a first adhesive layer between the substrate layer and the transparent resin layer to improve the adhesion between the substrate layer and the transparent resin layer. The decorative sheet of the present disclosure may include, for example, the design layer, the first adhesive layer, and the transparent resin layer, in order from the side close to the substrate layer, or may include the first adhesive layer, the design layer, and the transparent resin layer, in order from the side close to the substrate layer.

The first adhesive layer is composed of, for example, an adhesive. Examples of the adhesive include urethane resin-based adhesives, (meth)acrylic resin-based adhesives, epoxy resin-based adhesives, and rubber-based adhesives. Of these adhesives, urethane resin-based adhesives are preferred in terms of adhesive strength.

Examples of the urethane resin-based adhesives include adhesives including two-component curable urethane resins containing various polyol compounds, such as polyether polyol, polyester polyol, and (meth)acrylic polyol, and curing agents, such as the various isocyanate compounds described above.

The thickness of the first adhesive layer is preferably 0.1 μm or more, more preferably 1 μm or more, still more preferably 2 μm or more, and preferably 30 μm or less, more preferably 15 μm or less, still more preferably 10 μm or less, and is, for example, 0.1 μm or more and 30 μm or less.

The decorative sheet of the present disclosure may include a second adhesive layer on the surface of the substrate layer on the side opposite from the design layer. The second adhesive layer is provided as necessary for the purpose of improving the adhesion between the decorative sheet and an exterior material used as an adherend.

The second adhesive layer is composed of, for example, an adhesive. Examples of the adhesive include (meth)acrylic resin, (meth)acrylic-modified polyolefin, chlorinated polyolefin, vinyl chloride resin, vinyl acetate resin, vinyl chloride-vinyl acetate copolymer, styrene-(meth)acrylic copolymer, polyester, polyurethane, and polyamide. Two-component curable polyurethane-based adhesives or polyester-based adhesives that include isocyanate compounds or other compounds as curing agents may also be used. Examples of the adhesive also include (meth)acrylic-based, urethane-based, silicone-based, and rubber-based adhesives (pressure-sensitive adhesives).

To obtain high adhesion, the thickness of the second adhesive layer is preferably 1 μm or more, more preferably 5 μm or more, still more preferably 10 μm or more, and preferably 100 μm or less, more preferably 50 μm or less, still more preferably 30 μm or less, and is, for example, 1 μm or more and 100 μm or less.

The decorative sheet of the present disclosure may have unevenness formed by embossing or other techniques. For example, the sheet can be embossed by heating the sheet preferably to 80° C. or higher and 260° C. or lower, more preferably 100° C. or higher and 220° C. or lower, more preferably 120° C. or higher and 200° C. or lower, and pressing an embossing plate against the sheet. Preferably, the embossing plate is pressed against the surface protective layer side of the sheet.

A decorative material of the present disclosure includes an exterior material and the decorative sheet of the present disclosure on at least part of the surface of the exterior material. The decorative material may include an adhesive layer between the exterior material and the decorative sheet. The adhesive layer is composed of, for example, the adhesive described for the second adhesive layer. The decorative sheet may include a second adhesive layer. The decorative material is produced by, for example, placing the decorative sheet on an exterior material such that a surface of the exterior material to be decorated faces the surface of the decorative sheet on the substrate layer side.

Figure 2:
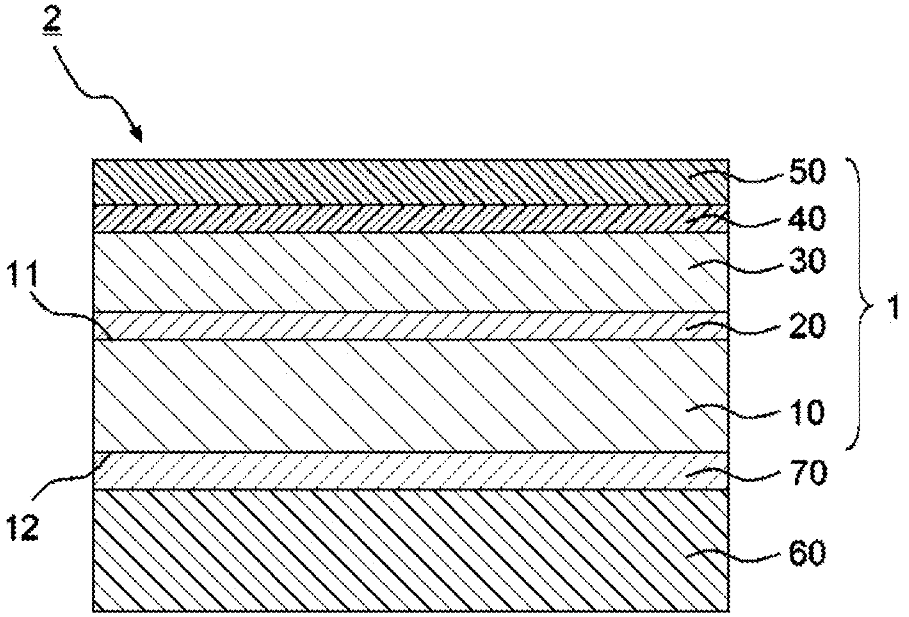
FIG. 2 is a schematic cross-sectional view of an embodiment of a decorative material of the present disclosure.

FIG. 2 is a schematic cross-sectional view of an embodiment of the decorative material of the present disclosure. A decorative material 2 includes an exterior material 60, an adhesive layer 70, and the decorative sheet 1 in this order. The decorative sheet 1 is disposed such that the substrate layer 10 faces the exterior material 60. In the decorative material 2, the surface protective layer 50 forms the outermost layer. The decorative sheet 1 may include a second adhesive layer, not shown, instead of the adhesive layer 70.

The decorative material of the present disclosure is produced by, for example, disposing the decorative sheet of the present disclosure on the surface of the exterior material. In one embodiment, the decorative sheet of the present disclosure is attached to the exterior material such that the second adhesive layer in the decorative sheet is in contact with the surface of the exterior material. In one embodiment, the decorative sheet of the present disclosure is attached to the exterior material with the adhesive layer therebetween such that the substrate layer in the decorative sheet faces the surface of the exterior material. The attachment may be performed under heat and pressure.

The exterior material is a molded body used outdoors, such as a molded body for applications requiring weather resistance against daily exposure to direct sunlight. The decorative sheet of the present disclosure is suitable for exterior materials because of its high weather resistance. The exterior material may have any shape. Examples of the shape of the exterior material include boards, such as flat boards and curved boards, three-dimensional articles, sheets, and films.

Examples of the exterior material include resin members, wooden members, and inorganic members.

Examples of the resin members include sheets, boards, and three-dimensional articles made of polyolefin, polyvinyl chloride resin, styrene resin, (meth)acrylic resins, polyester, polycarbonate, polyamide, polyimide, cellulose resin, phenol resin, rubber, and other materials.

Examples of the wooden members include boards and three-dimensional articles made of wood veneer, wood plywood, particleboard, and wood fiberboard, such as medium density fiberboard (MDF) and laminated wood. In one embodiment, the decorative material is a decorative laminate in which the exterior material is a wooden member.

Examples of the inorganic members include metal members and other inorganic members. Examples of the metal members include sheets, boards, and three-dimensional articles made of iron, aluminum, copper, tin, titanium, and alloys (e.g., carbon steel, stainless steel, duralumin, brass, and bronze) containing at least one of these metals. Examples of other inorganic members include boards and three-dimensional articles made of glass, ceramics, such as porcelain, non-cement ceramic materials, such as gypsum, and autoclaved lightweight aerated concrete (ALC) panels.

Examples of the exterior material include exterior materials for building structures, exterior materials for vehicles, ships, and aircraft, and exterior materials for industrial machines. Examples of exterior materials (building materials) for building structures include exterior walls, roofs, soffits, floors, fences, various doors, such as entrance doors and gates, window materials, handrails, balcony partitions, roof members for terraces or carports, agricultural greenhouses, and soundproof walls and windbreak walls for local roads and highways. Examples of exterior materials for vehicles include materials for windows, such as side windows, rear windows, roof windows, front windows, and quarter windows; headlight covers, turn signal lamp lenses, and reflectors; and pillars. Examples of vehicles include automobiles, railcars, construction machines, and light vehicles, such as golf carts.

The thickness of the exterior material is appropriately selected according to the intended use and the materials. In one embodiment, the thickness of the exterior material may be 0.1 mm or more, 0.3 mm or more, 0.5 mm or more, and 10 mm or less, 5 mm, 3 mm or less, and may be, for example, 0.1 mm or more and 10 mm or less.

The present disclosure relates to, for example, the following [1] to [14].

[1] A decorative sheet for exterior materials including a substrate layer, a design layer, a transparent resin layer, and a surface protective layer in this order, wherein the substrate layer includes a polyolefin, the transparent resin layer includes a polyolefin, and the surface protective layer includes a cured resin, a first UV absorber having an absorption peak at a first wavelength, a second UV absorber having an absorption peak at a second wavelength longer than the first wavelength, and a third UV absorber having an absorption peak at a third wavelength longer than the second wavelength.

[2] The decorative sheet according to [1], wherein a difference between the second wavelength and the first wavelength is 10 nm or more, and a difference between the third wavelength and the second wavelength is 10 nm or more.

[3] The decorative sheet according to [1] or [2], wherein the second wavelength is in a range of 310 nm or more to 330 nm or less.

[4] The decorative sheet according to any one of [1] to [3], wherein the first wavelength is in a range of 270 nm or more to 300 nm or less.

[5] The decorative sheet according to any one of [1] to [4], wherein the third wavelength is in a range of 340 nm or more to 370 nm or less.

[6] The decorative sheet according to any one of [1] to [5], wherein in the surface protective layer, an amount of the second UV absorber is larger than that of the first UV absorber and larger than that of the third UV absorber.

[7] The decorative sheet according to any one of [1] to [6], wherein the first UV absorber, the second UV absorber, and the third UV absorber are each independently a triazine UV absorber.

[8] The decorative sheet according to any one of [1] to [7], wherein the surface protective layer includes a total of 0.5 parts by mass or more and 10 parts by mass or less of the first UV absorber, the second UV absorber, and the third UV absorber relative to 100 parts by mass of the cured resin contained in the surface protective layer.

[9] The decorative sheet according to any one of [1] to [8], wherein the surface protective layer includes, relative to 100 parts by mass of the cured resin contained in the surface protective layer, 0.1 parts by mass or more and 3 parts by mass or less of the first UV absorber, 0.1 parts by mass or more and 8 parts by mass or less of the second UV absorber, and 0.1 parts by mass or more and 3 parts by mass or less of the third UV absorber.

[10] The decorative sheet according to any one of [1] to [9], further including a primer layer between the transparent resin layer and the surface protective layer.

[11] The decorative sheet according to [10], wherein the primer layer includes a UV absorber.

[12] The decorative sheet according to any one of [1] to [11], wherein the transparent resin layer includes a UV absorber.

[13] The decorative sheet according to any one of [1] to [12], wherein an absorbance A4 of a laminate portion including the transparent resin layer and the surface protective layer in a wavelength range of 280 nm or more to 350 nm or less is 0.2 or higher.

[14] A decorative material including an exterior material and the decorative sheet according to any one of [1] to [13] on at least part of a surface of the exterior material.

EXAMPLE

The decorative sheet of the present disclosure will be described below in more detail by way of Example, but the decorative sheet of the present disclosure is not limited by Example.

Example 1

A 60 μm-thick polypropylene sheet with both sides treated with corona discharge was prepared as a substrate. A printing ink containing a two-component curable acrylic-urethane resin and a colorant was applied to one side of the substrate by gravure printing to form a wood grain pattern design layer with a thickness of 3 μm. A resin composition containing a two-component curable urethane-nitrocellulose blend resin (containing 5 parts by mass of curing agent hexamethylene diisocyanate per 100 parts by mass of resin) was applied to the other side of the substrate to form a back primer layer with a thickness of 3 μm.

A transparent urethane resin-based adhesive was applied to the design layer and dried to form an adhesive layer with a thickness of 3 μm. Transparent polypropylene was hot-melted and extruded using a T-die extruder to form a transparent resin layer with a thickness of 80 μm on the adhesive layer.

A primer layer resin composition was prepared by mixing 100 parts by mass of a mixture of polycarbonate-based urethane-acrylic copolymer and an acrylic polyol, 5 parts by mass of hexamethylene diisocyanate used as a curing agent, 20 parts by mass of a UV absorber, and a diluent solvent. After the surface of the transparent resin layer was treated with corona discharge, the primer layer resin composition was applied to the treated surface by gravure printing and dried to form a primer layer with a thickness of 4 μm.

The ionizing radiation-curable resin composition describe below was applied to the primer layer to form an uncured resin layer, and the uncured resin layer was cured by exposure to an electron beam (acceleration voltage: 165 kV, exposure dose: 5 Mrad (50 kGy)) to form a surface protective layer with a thickness of 5 μm.

| <Ionizing Radiation-Curable Resin Composition> | |
|---|---|
| Trifunctional urethane acrylate oligomer with a weight-average molecular weight of 4,000 | 100 parts by mass |
| First UV absorber<br>Hydroxyphenyl triazine UV absorber,<br>Product name: ADK STAB LA-46, ADEKA Corporation,<br>Absorption peak wavelength: 275 nm | 0.5 parts by mass |
| Second UV absorber<br>Hydroxyphenyl triazine UV absorber,<br>Product name: TINUVIN 479, BASF<br>Absorption peak wavelength: 322 nm | 3 parts by mass |
| Third UV absorber<br>Hydroxyphenyl triazine UV absorber,<br>Product name: TINUVIN 477, BASF,<br>Absorption peak wavelength: 356 nm | 0.5 parts by mass |
| Hindered amine non-reactive light stabilizer<br>Product name: TINUVIN 123, BASF,<br>Bis(1-octyloxy-2,2,6,6-tetramethyl-4-piperidinyl)sebacate | 3 parts by mass |
| Hindered amine reactive light stabilizer<br>Product name: Sunol LS-3410, Nippon Nyukazai Co., Ltd.<br>1,2,2,6,6-Pentamethyl-4-piperidyl-methacrylate | 1.5 parts by mass |

A decorative sheet was produced as described above.

Comparative Example 1

A decorative sheet was produced in the same manner as in Example 1 except that, in the ionizing radiation-curable resin composition, no first UV absorber was blended, the amount of the second UV absorber (TINUVIN 479) was changed to 1 part by mass, the amount of the third UV absorber (TINUVIN 477) was changed to 3 parts by mass, and no hindered amine reactive light stabilizer was blended.

[Absorbance]

A test piece was prepared by forming a surface protective layer on a polyethylene terephthalate (PET) film under the same conditions as described above. The absorbance of the test piece in each wavelength range was measured by using a UV-visible-near-infrared spectrophotometer (product name: UH-4150, available from Hitachi, Ltd.) in accordance with JIS K 0115:2004. From this absorbance, the absorbance of the PET film was subtracted to obtain the "absorbance A1", "absorbance A2", and "absorbance A3" described above.

A test piece was prepared by forming a transparent resin layer, a primer layer, and a surface protective layer on a polyethylene terephthalate (PET) film under the same conditions as described above. The absorbance of the test piece was measured by using a UV-visible-near-infrared spectrophotometer (product name: UH-4150, available from Hitachi, Ltd.) in accordance with JIS K 0115:2004. From this absorbance, the absorbance of the PET film was subtracted to obtain the "absorbance A4" described above.

The absorbances in Example 1 are as described below.

Absorbance A1: 0.9
Absorbance A2: 1.6
Absorbance A3: 0.5
Absorbance A4: 3.6

The absorbances in Comparative Example 1 are as described below.

Absorbance A1: 0.3

Absorbance A2: 0.8

Absorbance A3: 0.7

Absorbance A4: 3.3

[Weather Resistance]

Using the super-accelerated weathering tester described below, the decorative sheets produced in Example and Comparative Example were subjected to 1400 hours of a super-accelerated weathering test. The test in which the following cycle is repeated: one cycle includes 20 hours of exposure to UV irradiation under the following exposure conditions, and 4 hours of condensation under the following condensation conditions after the 20 hours of exposure to UV irradiation. After 1400 hours, the appearance of the decorative sheets was visually evaluated based on the following criteria.

<Super-Accelerated Weathering Tester>

A super-accelerated weathering tester (product name: EYE Super UV Tester SUV-W261, available from Iwasaki Electric Co. Ltd.) equipped with a UV lamp (product name: M04-L21WB/SUV, available from Iwasaki Electric Co., Ltd.), a lamp jacket (product name: WJ50-SUV, available from Iwasaki Electric Co., Ltd.) and an illuminometer (product name: UVD-365PD, available from Iwasaki Electric Co., Ltd.).

<Exposure Conditions>

Black panel temperature: 63° C.

Illuminance: 100 $mW/cm^2$

Humidity in chamber: 50% RH

Time: 20 hours

<Condensation Conditions>

Illuminance: 0 $mW/cm^2$

Humidity in chamber: 98% RH

Time: 4 hours

<Evaluation Criteria>

A: No appearance change was observed in the entire decorative sheet.

B: A slight whitening was observed in the appearance of the decorative sheet, but no change in color tone was observed in the transparent resin layer and/or the substrate layer.

C: A slight whitening was observed in the appearance of the decorative sheet, and a slight change in color tone was observed in the transparent resin layer and/or the substrate layer.

D: A significant whitening was observed in the appearance of the decorative sheet, and a large change in color tone was observed in the transparent resin layer and/or the substrate layer.

The evaluation results of the decorative sheets produced in Example and Comparative Example were as described below.

Example 1: A

Comparative Example 1: C

It should be understood by those skilled in the art that the decorative sheet and the like of the present disclosure are not limited by the description of Example above, and Example and this description are merely for illustrating the principle of the present disclosure, and various modifications or improvements can be made without departing from the spirit and scope of the present disclosure, and all of these modifications or improvements are included in the scope of the present disclosure as claimed. Furthermore, the scope claimed by the present disclosure includes not only the scope of the claims but also equivalents thereof.

REFERENCE SIGNS LIST

1 decorative sheet
2 decorative material
10 substrate layer
20 design layer
30 transparent resin layer
40 primer layer
50 surface protective layer
60 exterior material
70 adhesive layer

The invention claimed is:

1. A decorative sheet for exterior materials, the decorative sheet comprising a substrate layer, a design layer, a transparent resin layer, a primer layer, and a surface protective layer in this order, wherein the substrate layer includes a polyolefin, the transparent resin layer includes a polyolefin, and the surface protective layer includes a cured resin, a first UV absorber having an absorption peak at a first wavelength, a second UV absorber having an absorption peak at a second wavelength longer than the first wavelength, and a third UV absorber having an absorption peak at a third wavelength longer than the second wavelength.

2. The decorative sheet according to claim 1, wherein a difference between the second wavelength and the first wavelength is 10 nm or more, and a difference between the third wavelength and the second wavelength is 10 nm or more.

3. The decorative sheet according to claim 1, wherein the second wavelength is in a range of 310 or more nm to 330 nm or less.

4. The decorative sheet according to claim 1, wherein the first wavelength is in a range of 270 nm or more to 300 nm or less.

5. The decorative sheet according to claim 1, wherein the third wavelength is in a range of 340 nm or more to 370 nm or less.

6. The decorative sheet according to claim 1, wherein in the surface protective layer, an amount of the second UV absorber is larger than that of the first UV absorber and larger than that of the third UV absorber.

7. The decorative sheet according to claim 1, wherein the first UV absorber, the second UV absorber, and the third UV absorber are each independently a triazine UV absorber.

8. The decorative sheet according to claim 1, wherein the surface protective layer incudes a total of 0.5 parts by mass or more and 10 parts by mass or less of the first UV absorber, the second UV absorber, and the third UV absorber relative to 100 parts by mass of the cured resin contained in the surface protective layer.

9. The decorative sheet according to claim 1, wherein the surface protective layer incudes, relative to 100 parts by mass of the cured resin contained in the surface protective layer, 0.1 parts by mass or more and 3 parts by mass or less of the first UV absorber, 0.1 parts by mass or more and 8 parts by mass or less of the second UV absorber, and 0.1 parts by mass or more and 3 parts by mass or less of the third UV absorber.

10. The decorative sheet according to claim 1, wherein the primer layer includes a UV absorber.

11. The decorative sheet according to claim 1, wherein the transparent resin layer includes a UV absorber.

12. The decorative sheet according to claim 1, wherein an absorbance A4 of a laminate portion including the transparent resin layer and the surface protective layer in a wavelength range of 280 nm or more to 350 nm or less is 0.2 or higher.

13. A decorative material comprising:

an exterior material; and the decorative sheet according to claim 1 on at least part of a surface of the exterior material.

* * * * *